(12) United States Patent
Maekawa et al.

(10) Patent No.: US 6,509,894 B1
(45) Date of Patent: Jan. 21, 2003

(54) POWER GENERATOR CIRCUIT, GENERATING METHOD THEREOF, AND LIQUID CRYSTAL DISPLAY DEVICE

(75) Inventors: Toshikazu Maekawa, Kanagawa (JP); Yoshiharu Nakajima, Kanagawa (JP); Shintarou Morita, Kanagawa (JP)

(73) Assignee: Sony Corporation (JP)

(*) Notice: Subject to any disclaimer, the term of this patent is extended or adjusted under 35 U.S.C. 154(b) by 0 days.

(21) Appl. No.: 09/501,307

(22) Filed: Feb. 10, 2000

(30) Foreign Application Priority Data

Feb. 18, 1999 (JP) .......................... 11-039413
Dec. 24, 1999 (JP) .......................... 11-367235

(51) Int. Cl.⁷ .............................................. G09G 5/00
(52) U.S. Cl. ................... 345/211; 345/212; 345/213; 345/96; 323/313
(58) Field of Search .................. 345/87–100, 204–214; 323/313, 349; 327/427, 535

(56) References Cited

U.S. PATENT DOCUMENTS

| | | | |
|---|---|---|---|
| 4,307,333 A | 12/1981 | Hargrove | |
| 4,581,546 A | 4/1986 | Allan | |
| 4,961,007 A | 10/1990 | Kumanoya et al. | |
| 5,003,197 A | 3/1991 | Nojima et al. | |
| 5,754,155 A | 5/1998 | Kubota et al. | |
| 5,940,055 A | * 8/1999 | Lee | 345/87 |
| 5,940,058 A | * 8/1999 | Koyama | 345/89 |
| 6,040,827 A | * 3/2000 | Shiina et al. | 345/208 |

FOREIGN PATENT DOCUMENTS

| | | |
|---|---|---|
| DE | 198 32 297 A1 | 1/1999 |
| EP | 0469 587 A2 | 5/1992 |
| EP | 0469 587 A3 | 5/1992 |

OTHER PUBLICATIONS

Koyama J. et al.: "Low–Temperature Poly–Si TFT–LCDS with Digital Interface"; International Conference on Solid State Devices and Materials, JA, Japan Society of Applied Physics. Tokyo, Sep. 1, 1997, pp. 348–349.

Saito S et al.: "A 6–Bit Digital Data Driver for Color FTF–LCDS" NEC Research and Development, JP, Nippon Electric Ltd. Tokyo, vol. 36, No. 4, Oct. 1, 1995, pp. 485–492.

Mano H et al.: "TFT–LCD Drive Method and Driver LSI"; Hitachi Review, JP, Hitachi Ltd. Tokyo, vol. 45, No. 4, Aug. 1, 1996, pp. 177–182.

\* cited by examiner

Primary Examiner—Dennis-Doon Chow
Assistant Examiner—Amr Awad
(74) Attorney, Agent, or Firm—Rader, Fishman & Grauer PLLC; Ronald P. Kananen, Esq.

(57) ABSTRACT

A power generator circuit, generation method, and liquid crystal display (LCD) wherein the power generator circuit does not require the design of a set when a negative or positive power generator circuit is installed outside the LCD panel. In a liquid crystal display integrated-with-drive circuit, a positive or negative power generator circuit is incorporated into the LCD panel and supplies a positive or negative voltage to a vertical driver circuit.

17 Claims, 12 Drawing Sheets

F I G. 1
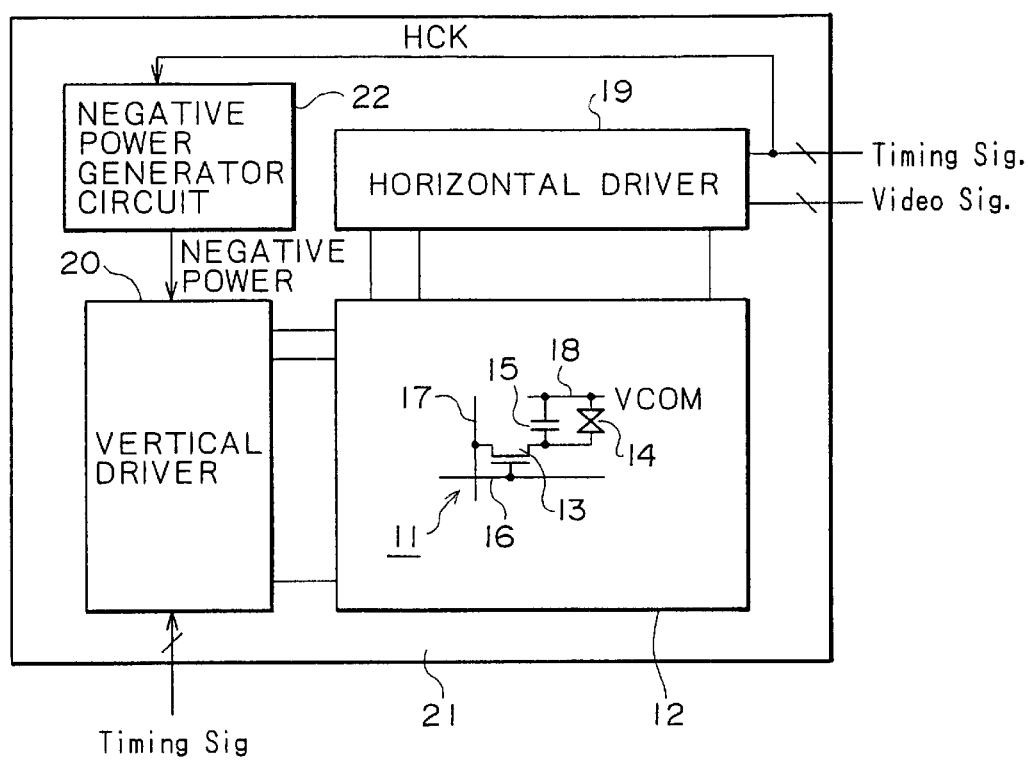
F I G. 2
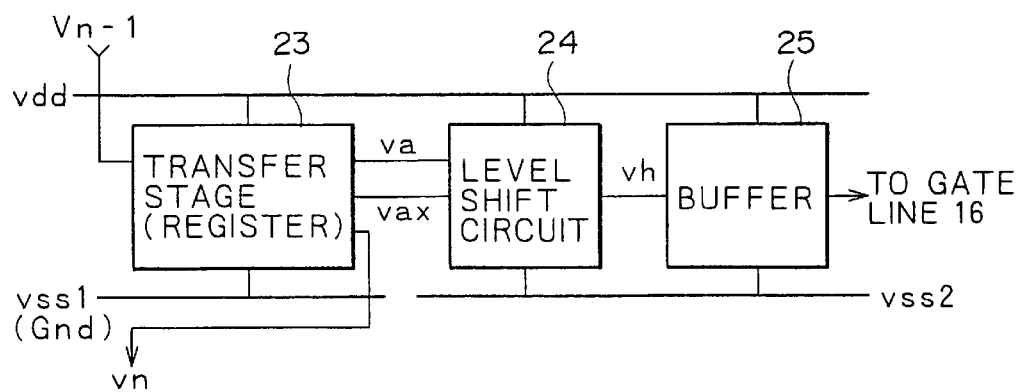

F I G. 5
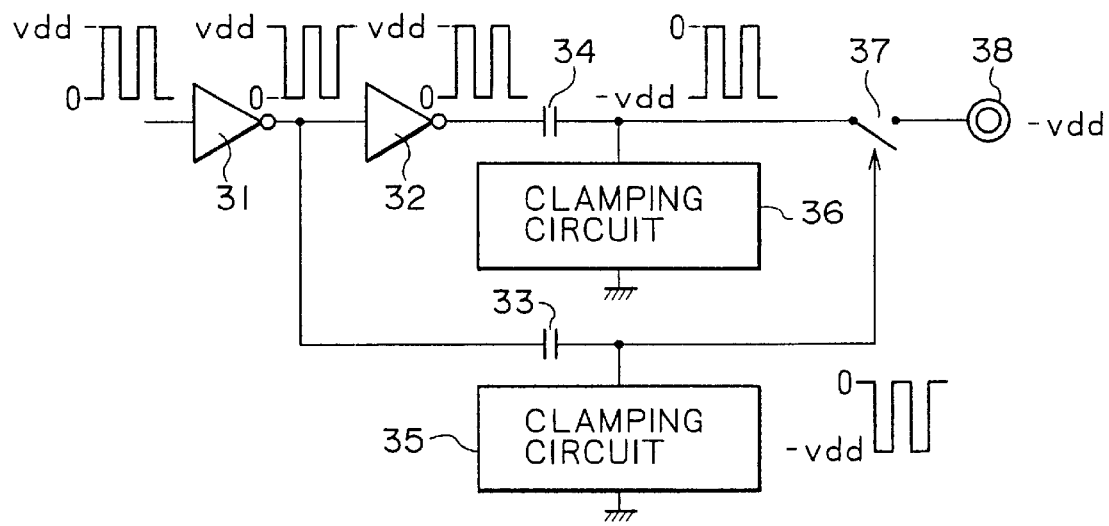
F I G. 6
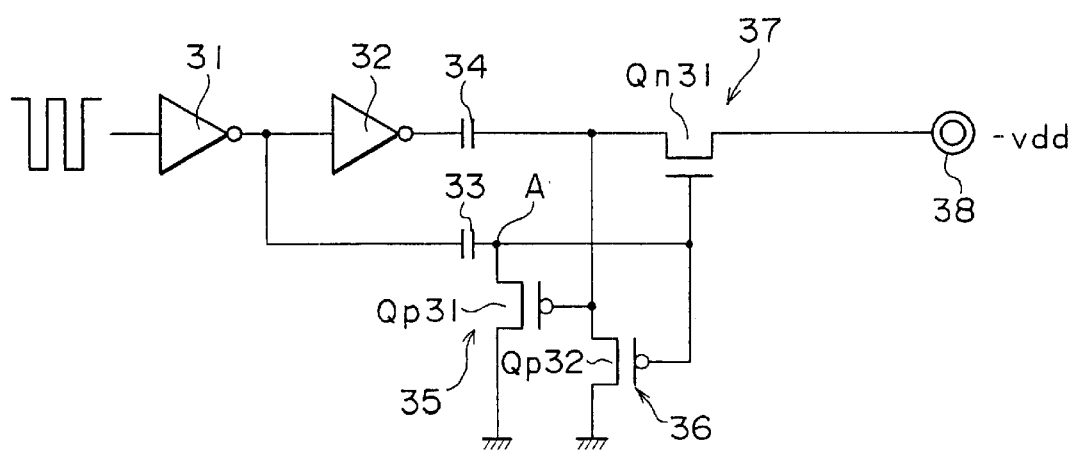

F I G. 17
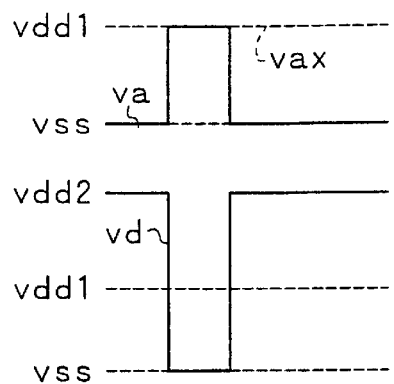
F I G. 18
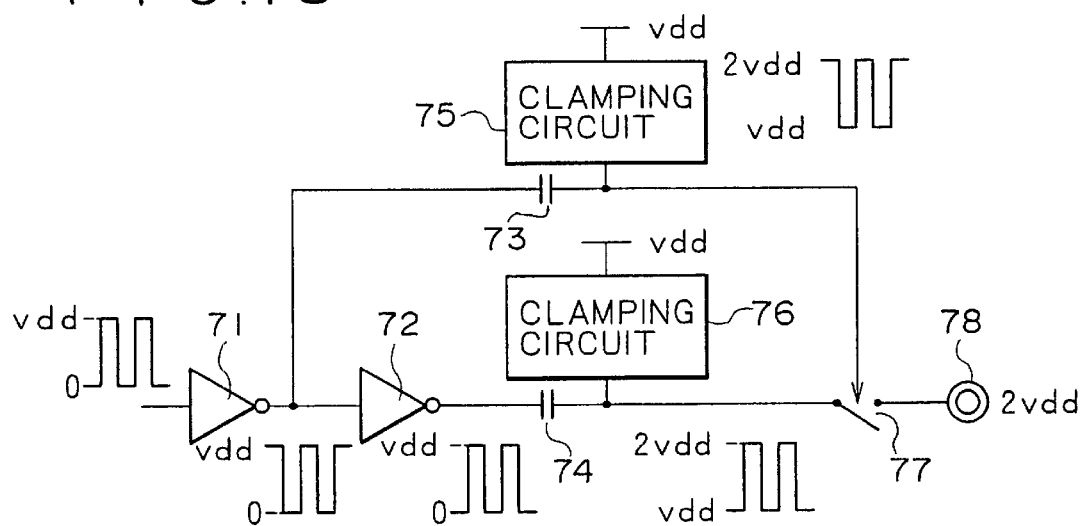
F I G. 19
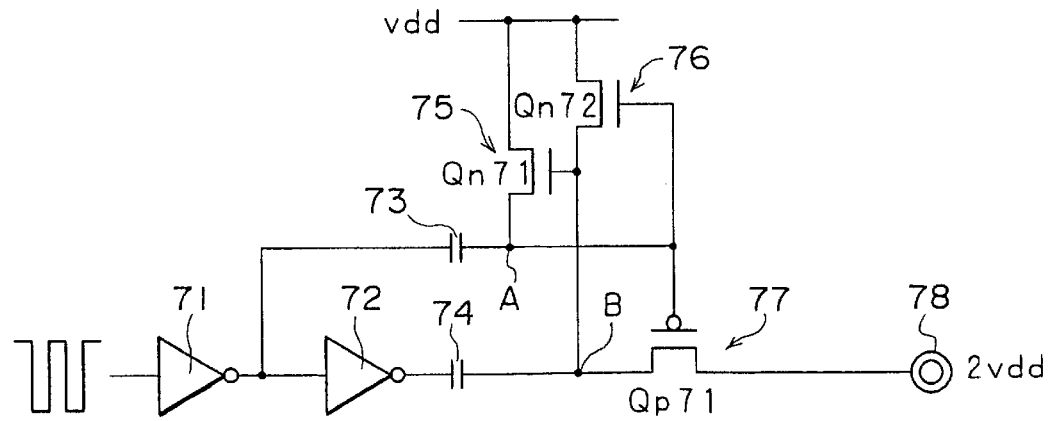

POWER GENERATOR CIRCUIT, GENERATING METHOD THEREOF, AND LIQUID CRYSTAL DISPLAY DEVICE

BACKGROUND OF THE INVENTION

1. Field of the Invention

The present invention relates to a power generator circuit and generation method for generating a positive or negative power supply voltage, an active matrix type liquid crystal display device (LCD) and relates in particular to a liquid crystal display integrated-with-drive circuit.

2. Description of the Related Art

In recent years, many demands have been made for liquid crystal display devices operating on a low voltage, and having high image quality and high performance such as high contrast. These demands for high contrast and for low voltage operation however, generally conflict with each other. In other words, the video signal amplitude input to the liquid crystal display LCD has to be increased in order to increase the contrast. As a result, the voltage for driving the LCD becomes higher so that low voltage operation cannot be achieved. Conversely, attenuating the video signal amplitude to achieve low voltage operation has the effect of reducing the contrast (See FIG. 23A and FIG. 23B).

Whereupon, in order to simultaneously satisfy the dual requirements of high contrast and low voltage operation, a method was employed that lowered the low voltage (VL) of the video signal as much as possible (in other words, to nearly ground potential), lowered the center value (VD) of the video signal, and also lowered the high voltage (VH) of the video signal while raising the dynamic range of the video signal.

However, when this method is employed, in the pixel transistor of the equalizer circuit shown in FIG. 24, when the threshold voltage Vth of a pixel transistor 101 holding the high voltage (VH) of the video signal, approaches the depression, and the scan line (gate line) 102 is zero (0) volts and the source line 103 is at a low level (hereafter listed as "L" level), then the pixel transistor 101 may leak as shown in FIG. 25, forming a so-called leak luminance spot. An example of this characteristic of the pixel transistor 101 is shown in FIG. 26.

The above mentioned method was therefore not employed up until now and either high contrast or low voltage operation was selected for use on a case-by-case basis. However, it is known that if the "L" level of the scan line 102 can be set to a minus (negative) value, then an ample margin versus these leak luminance spots can be obtained. However, to obtain this minus (negative) value, a negative power generator circuit must be provided to set the scan line 102 to a minus (negative) value. In the related art, this negative power generator circuit had to be installed outside the LCD panel creating the additional burden of set design.

Also, in the case of an LCD using the dot sequential scanning method, the problem arose of different write times onto the pixel during horizontal scanning at the scanning start side (for instance, the left side of the panel) and the scanning end side (for instance, the right side of the panel). In other words, with a panel write time of about 1H (approximately 63 μsec) on the left side of the panel, a write time of several seconds (for instance 5 μsec) was needed to extinguish the gate select pulse, immediately after write was finished on the right side of the panel.

Therefore, in an LCD using the dot sequential scanning method, when a transistor having poor device characteristics was utilized as the pixel transistor 101, the write times on the left side and right side of the panel were different, because of the short write time on the right side of the panel, so that the pixel transistor 101 could not turn off sufficiently. Writing omissions therefore occurred so that the luminance was different on the right and left sides of the panel, in turn creating the problem of poor image quality.

SUMMARY OF THE INVENTION

In view of the above problems with the related art, it is therefore an object of the present invention to provide a power supply generation method, a power generator circuit with a simple structure for generating a power supply voltage, and a liquid crystal display device (LCD) that along with having an expanded dynamic range for the input signal, has good image quality and does not require the installation of a power generator circuit outside the LCD panel section.

The power generator circuit of this invention has a structure comprised of a first clamping means to clamp the high level or low level of a clock pulse having a phase opposite the phase of the input clock to a reference voltage level at (or lower than) ground level or to a positive reference voltage level, a second clamping means to clamp the high level or low level of a clock pulse having a positive phase versus the phase of the input clock to a reference voltage level at (or lower than) ground level or to a positive reference voltage level, and a sampling means to sample the high level or low level of the clamped output of the first clamping means, and the high level or low level of the clamped output of the second clamping means. This power generator circuit is formed on the panel (circuit board) of the liquid crystal display integrated-with-drive circuit.

In the above mentioned power generator circuit and liquid crystal display device, the high or low level of a clock having a reversed or positive phase versus the input clock is clamped to a reference voltage level at (or below) ground level or to a positive reference voltage level, and by sampling the high level or low level side of the positive phase clamped clock at the low level or high level of the reversed phase of the clamped clock, a negative power supply voltage with respect to the reference level is generated when clamped at the high level of the clock, and a positive power supply voltage higher than the power supply voltage by an amount equal to the reference voltage level is generated when clamped at the low level of the clock.

BRIEF DESCRIPTION OF THE DRAWINGS

Preferred embodiments of the present invention will be described in detail based on the following, wherein:

FIG. 1 is a block diagram of the overall structure of the active matrix liquid crystal display device of the first embodiment of this invention;

FIG. 2 is a block diagram of the structure of the shift register comprising the vertical driver of the first embodiment;

FIG. 5 is a block diagram showing the structure of the negative power generator circuit;

FIG. 6 is a circuit diagram showing the first working example of the clamp circuit and sampling switch comprising the negative power generator circuit;

FIG. 17 is a waveform chart of the scan pulses before and after passing through the level shift circuit;

FIG. 18 is a block diagram showing the structure of the positive power generator circuit;

FIG. 19 is a circuit diagram showing a working example of the clamp circuit and sampling switch comprising the positive power generator circuit;

DETAILED DESCRIPTION OF THE PREFERRED EMBODIMENTS

Figure 3:
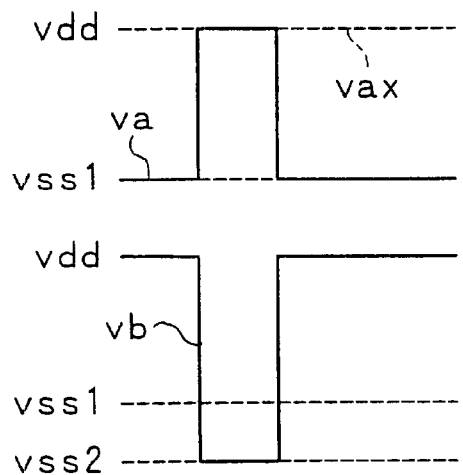
FIG. 3 is a drawing showing the scan pulses prior to and after passing through the level shift circuit.

A detailed description of the embodiments of this invention is next explained while referring to the accompanying drawings. FIG. 1 is a block diagram of the overall structure of the active matrix liquid crystal display device of the first embodiment of this invention.

In FIG. 1, a pixel 11 comprises an effective pixel area 12 arrayed in a two-dimensional matrix. In this effective pixel area 12, the pixel 11 is comprised by a thin film transistor (TFT) 13 as the pixel transistor made for instance of polysilicon, a liquid crystal cell 14 with a pixel electrode connected to the drain of this thin film transistor 13, and an auxiliary capacitor 15 with one electrode connected to the drain electrode of the thin film transistor 13.

In this pixel structure, in the thin film transistor 13 of the pixel 11, the gate electrode made for instance of molybdenum, of the thin film transistor 13 is connected to a gate line (scan line) 16, the source electrode made for instance from aluminum is connected to the source line (signal line) 17. The other electrode of the auxiliary capacitor 15 and the other electrode of the liquid crystal cell 14 are connected to a common line 18 made for instance of molybdenum and from which a common voltage VCOM is supplied.

A horizontal driver 19 is installed for instance on the upper side of the effective pixel area 12, and a vertical driver (scan driver) 20 is, for instance installed on the left side. The horizontal driver 19 operates on a timing signal such as the horizontal clock HCK, and with the input video signal as a reference, performs dot sequential drive of written data onto each pixel 1. The vertical driver 20 operates based on a timing signal such as the vertical clock VCK and sequentially drives each pixel 11 in line units.

The horizontal driver 19 and the vertical driver 20 are integrated with the glass substrate (hereafter referred to as the LCD panel) 21 and the effective pixel area 12 utilizing a polysilicon thin film transistor. A drive circuit containing the horizontal driver 19 and the vertical driver 20 is thus formed on the LCD panel 21 along with the effective pixel area 12 to comprise the liquid crystal display integrated-with-drive circuit. Also, in this embodiment, the negative power generator circuit 22 is integrated with the LCD panel 21 utilizing a polysilicon thin film transistor.

The negative power generator 22 is incorporated into the embodiment to generate a negative voltage for supply to a drive circuit such as the vertical driver 20. A clock faster (higher frequency) than the vertical clock VCK input to the vertical driver 20, such as horizontal clock HCK input to the horizontal driver 19 is used as the input, and the negative power supply voltage is generated based on this horizontal clock HCK. This negative power supply voltage is supplied to the second negative power supply line at the output stage of the vertical driver 20. The input clock for the negative power generator 22 is not limited to the timing clock input to the horizontal driver 19, and other clocks utilized in supply of a negative power supply may also be used.

FIG. 2 is a block diagram of a typical structure of the shift register comprising the vertical driver 20 of the active matrix liquid crystal display device of the first embodiment, and shows the structure of the transfer stage which is the shift register as well as its output stage.

The n-th transfer stage (register) 23, along with using the positive power supply vdd and the first negative power supply vss1 (ground in this example) as the drive voltage, shifting the shift pulse Vn−1 supplied from the previous stage (n−1), and supplying the shift pulse Vn thus obtained, to the next stage (n+1), also outputs in synchronization with this shift pulse, the scan pulses va, vax having mutually opposite phases. The amplitude of these scan pulses va, vax as can be clearly seen in the waveform (a) of FIG. 3, is vss1 through vdd.

The scan pulses va, vax are supplied to the level shift circuit 24. The level shift circuit 24 utilizes the positive voltage vdd and the second negative power supply voltage vss2 (vss2<vss1) generated by the previously related negative power supply voltage circuit 22, as the drive voltage and as shown by the waveform (b) of FIG. 3, level shifts (performs level conversion) the amplitude vss1 through vdd of the scan pulses va, vax, to the scan pulse vb amplitude. The scan pulse vb drives the nth gate line (scan line) 16 of the effective pixel area 12 (see FIG. 1) by way of the buffer 25 operated by the positive voltage vdd and the second negative power supply voltage vss2.

Figure 4:
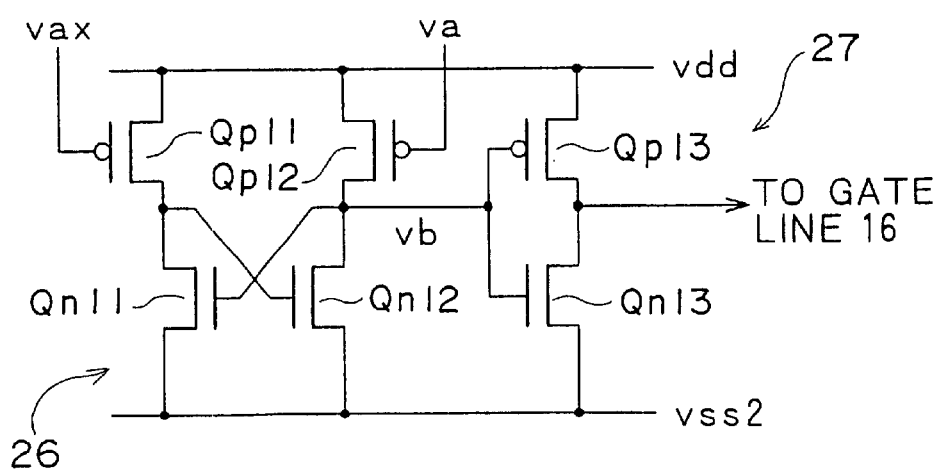
FIG. 4 is circuit diagram showing the structure of the level shift circuit.

The structure of the level shift circuit 24 is shown in FIG. 4. This level shift circuit 24 is comprised of a CMOS latch cell 26 and a CMOS inverter 27.

The CMOS latch cell 26 is comprised of a P-channel MOS transistor (hereafter simply listed as PMOS) Qp11 having a gate input by the inverted scan pulse vax and a source connected to the positive power supply vdd; a PMOS transistor Qp12 with a source connected to the positive power supply VDD and a gate input by the scan pulse va; an N-channel MOS (hereafter simply listed as NMOS) transistor Qn11 that, along with having a drain connected to the PMOS transistor Qp11 also has a source connected to the second negative power supply vss2 and further has a gate connected to the PMOS transistor Qp12; and an NMOS transistor Qn12 having a drain commonly connected to the PMOS transistor Qp12, a source connected to the second negative power supply vss2 and further has a gate connected to the drain of the PMOS transistor Qp11.

The CMOS inverter 27 is comprised of a PMOS transistor Qp13 having a gate connected to the output end of the CMOS latch cell 26, namely connected to the common connection point of the drain of the NMOS transistor Qn12 and the PMOS transistor Qp12, and having a source connected to the positive power supply vdd; and comprised of an NMOS transistor Qn13 having a gate and drain respectively connected in common with the transistor Qp13 and having a source connected to the second negative power supply vss2; and scan pulses from the common drain connection point of the PMOS transistor Qp13 and the NMOS transistor Qn13 drive the gate line 16 of the effective pixel area 12.

In the above related liquid crystal display integrated-with-drive circuit, since a negative power generator 22 is incorporated into the LCD panel 21 to supply the negative power supply voltage generated by this negative power generator 22 to the vertical driver 20, there is therefore no need to install a negative voltage generator circuit exterior to the LCD panel 21, making the task of set design easier. Also, the timing range of the input signal can be expanded without raising the power supply voltage of the LCD panel 21 and furthermore, good image quality (in particular, contrast) can be obtained.

FIG. 5 is a block diagram showing the structure of the negative power generator circuit 22. The negative power generator circuit 22 of this structure has the inverters 31, 32 to invert the input clocks and again perform inversion, condensers (filters) 33, 34 to cut the direct current component of the inverted outputs from these inverters 31, 32, clamping circuits 35, 36 to clamp the outputs from these condensers 33, 34 to a reference voltage level below ground level (ground level, in this example), and a sampling switch 37 to sample the clamped outputs of the clamping circuit 36 based on the clamped output of the clamping circuit 35, and a negative voltage –vdd is obtained from the circuit output terminal 38.

The circuit operation of the above configuration of the negative power generator circuit 22 is next explained.

In this negative power generator circuit 22, a clock having an amplitude from 0 to vdd volts, such as the horizontal clock HCK is input to the vertical driver 19 (See FIG. 1). This input clock is inverted in the inverter 31 and afterwards inverted once again. The respective inverted clocks for the inverter 31, 32, in other words the inverted phase of the clock and the positive phase of the clocks for the input clock are passed through the condensers (filters) 33, 34 and their direct DC components removed.

The respective high level (hereafter listed as "H" level) of the clocks that passed through the condensers (filters) 33, 34 are clamped at a reference voltage level within ground level (for instance, ground level of 0 volts). The clamped outputs of the clamping circuits 35, 36 thus have an amplitude from –vdd to 0 volts and further have mutually opposite phases, as clearly shown by the waveform in the drawing. Then, at the sampling switch 37 turning on at zero (0) volts, or in other words, reaching the "H" level of the clamped output of the clamping circuit 35, the clamped output of the low level side of the clamping circuit 35 is output or in other words, –vdd is output. This voltage is output from the circuit output terminal 38 as the negative power supply voltage –vdd.

A circuit diagram of the first working example of the clamping circuits 35, 36 and the sampling switch 37 is shown in FIG. 6. Sections in this figure identical to FIG. 5 are shown with the same reference numerals.

The clamp circuit 35 is comprised of a PMOS transistor Qp31 connected between the output end of the condenser 33 and ground having a gate connected to the output end of the condenser 34. The clamp circuit 36 is comprised of a PMOS transistor Qp32 connected between the output end of the condenser 34 and ground, and further having a gate connected to the output end of the condenser 33. The sampling switch 37 is comprised of an NMOS transistor Qn31 connected between the output end of condenser 34 and the circuit output terminal 38 and having a gate connected to the output end of the condenser 33.

The circuit operation of the clamping circuits 35, 36 as well as the sampling switch 37 are described next.

First of all, when the positive phase of the clock is at "L" level versus the input clock, the direct current components of the positive phase clock are removed by the condenser 34, and the voltage potential of the output end of the condenser 34 (hereafter node B) swings somewhat to the minus side. The PMOS transistor Qp31 is thus turned on. The PMOS transistor Qp31 then starts to pull the voltage potential at the output of the condenser 33 (hereafter referred to as node A) to ground potential.

When the voltage potential of the node A is pulled to ground potential, the PMOS transistor Qp32 also turns on. The voltage potential of node B then starts to be pulled to the minus side by the PMOS transistor Qp32 turning on and the voltage potential at node B lowers even further. The voltage potential of the node A further approaches ground level when the voltage potential drops on node B. This process is repeated so that by this positive feedback, the "H" level (vdd level) of the node A is clamped at zero (0) volts. The output of the clamping circuit 35 thus has an amplitude between –vdd and zero volts, and clock has a reverse phase clock versus the input clock.

However, when the reverse phase of the clock is at "L" level with respect to the input clock, the direct current components of the reverse phase clock are removed by the condenser 33, and the voltage potential at the node B swings somewhat to the minus side. The PMOS transistor Qp32 is thus made to turn on. The voltage potential of the node B then starts to be pulled towards ground potential by the PMOS transistor Qp32.

When the voltage potential of the node B is pulled to ground potential, the PMOS transistor Qp31 also turns on. The voltage potential of node A then starts to be pulled to the minus side by the PMOS transistor Qp31 turning on and the voltage potential at node A lowers even further. The voltage potential of the node B further approaches ground level when the voltage potential drops on node A. This process is repeated so that by this positive feedback, the "H" level of the node B is clamped at zero (0) volts. The output of the clamping circuit 36 thus has an amplitude between –vdd and zero volts, and has a positive phase clock versus the input clock.

Then, when the node A voltage potential is at "H" level, or in other words zero (0) volts, the NMOS transistor Qn31 turns on so that the clamped output of node A and the reverse phase of the clamped output of node B, or in other words, a "L" level (–vdd) is output. Also, when the voltage potential of node A is "L" level or in other words –vdd, the NMOS transistor Qn31 turns off so that –vdd is output unchanged.

In this way, since a positive feedback is applied when clamping is performed by the clamping circuits 35, 36 based on the other (complementary) input clock, the outputs are securely clamped to a reference level (ground level in this example) and a negative power supply voltage –vdd can be generated at the applicable reference voltage potential level.

Figure 7:
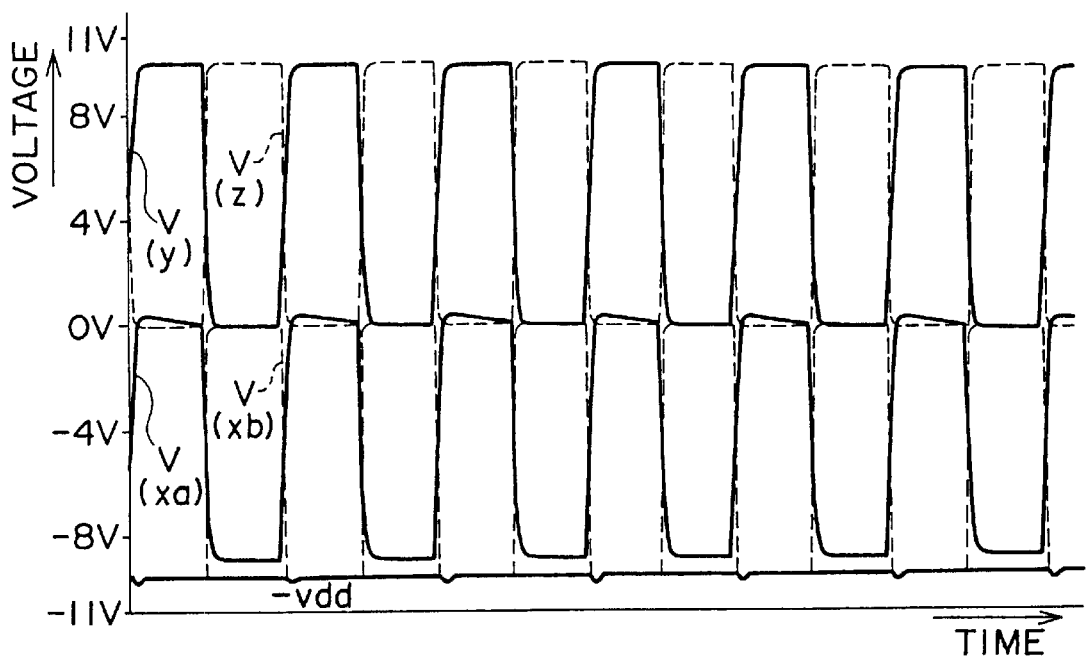
FIG. 7 is a waveform chart showing the simulation results.

The results of the simulation are shown in FIG. 7. In this figure, v (y) is the positive phase clock with respect to the input clock, v (z) is the reverse phase clock with respect to the input clock, v (xa) is the positive phase clamped output with respect to the input clock, v (xb) is the reverse phase clamped output with respect to the input clock, and –vdd shows the respective waveforms of each negative power supply voltage.

Figure 8:
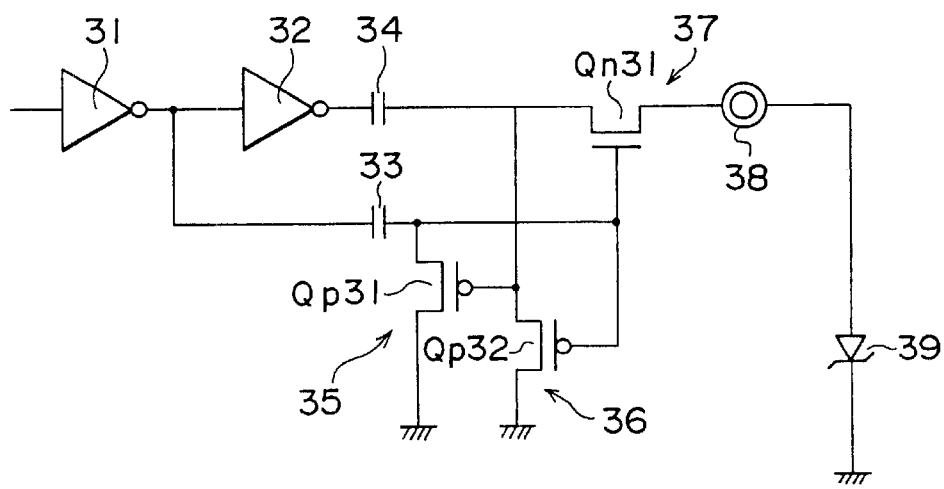
FIG. 8 is circuit diagram showing the first variation of the negative power generator circuit.
Figure 9:
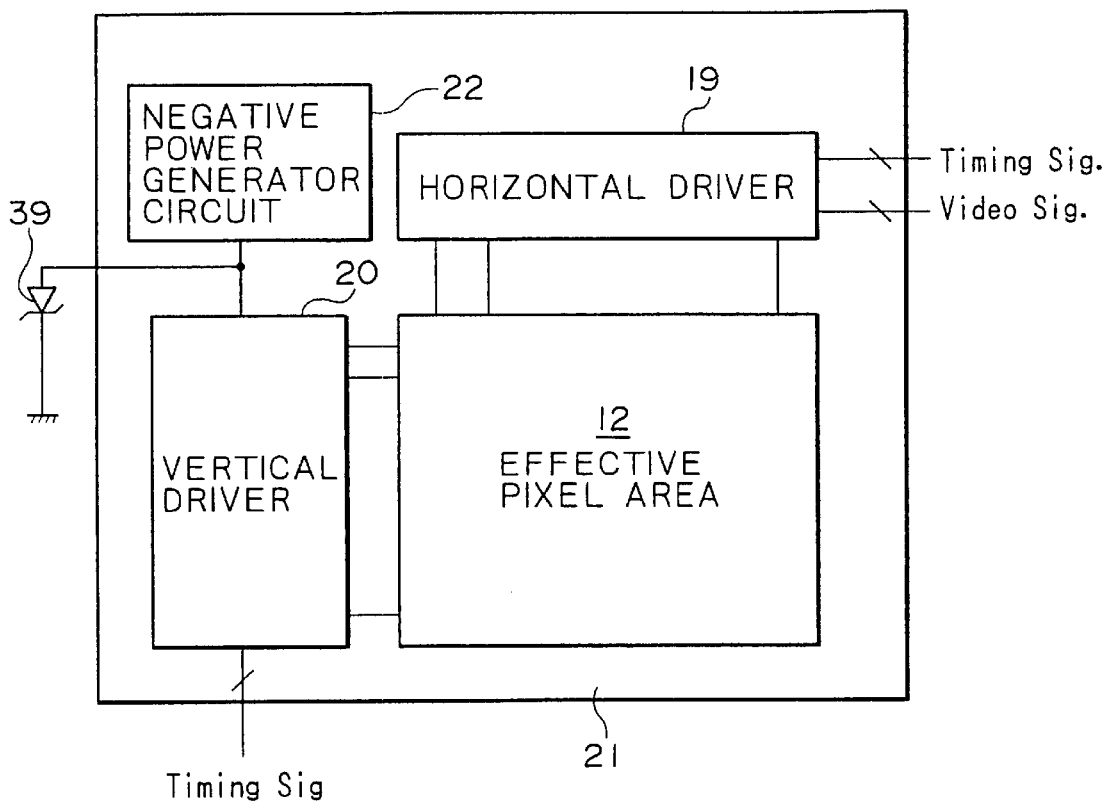
FIG. 9 is a block diagram showing the structure of the liquid crystal display device mounted with the first variation of the negative power generator circuit.

FIG. 8 is circuit diagram showing the first variation of the negative power generator circuit 22. In the figure, sections identical to FIG. 6 are shown with the same reference numerals. The first variation has a fixed voltage means, such as a Zener diode 39 connected between the output terminal 38 and ground. When the negative power generator circuit 22 of this first variation is mounted in the liquid crystal display integrated-with-drive circuit, the Zener diode 39 must be attached outside the LCD panel 21 as shown in FIG. 9.

By connecting the Zener diode between the circuit output terminal 38 and ground in this way, the voltage of the negative power supply –vdd is determined by the Zener diode 39 so that the desired voltage for the negative power supply vdd can be set easily and a stable voltage obtained by selecting an appropriate Zener diode voltage. The fixed voltage means is not limited to use only of a Zener diode and for instance, a bipolar diode or a MOS diode may be used.

Figure 10:
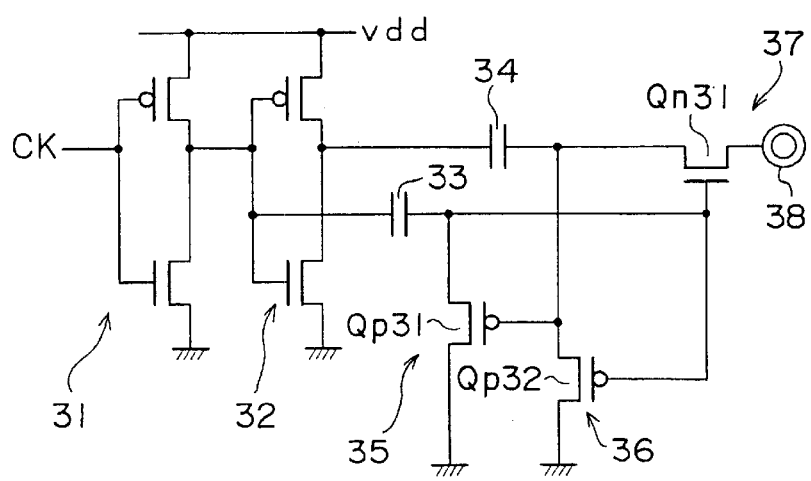
FIG. 10 is a circuit diagram showing the second variation of the negative power generator circuit.

FIG. 10 is a circuit diagram showing the second variation of the negative power generator circuit 22. In the figure, sections identical to FIG. 6 are shown with the same reference numerals. The negative power generator circuit 22 in this second variation is a circuit comprised of the inverters 31, 32 each utilizing a CMOS inverter. This circuit configuration has basically the same circuit operation as in FIG. 6.

Figure 11:
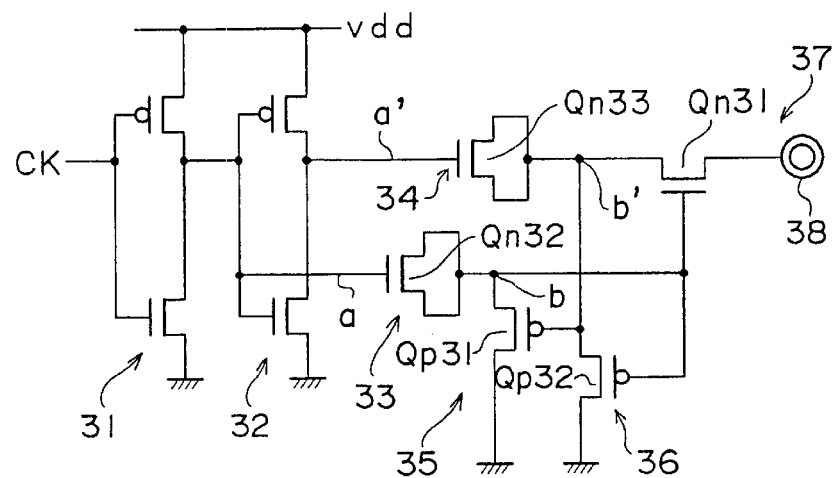
FIG. 11 is a circuit diagram showing the third variation of the negative power generator circuit.

FIG. 11 is a circuit diagram showing the third variation of the negative power generator circuit 22. In the figure, sections identical to FIG. 10 are shown with the same reference numerals. The negative power generator circuit 22 in this third variation is a circuit comprised of the inverters 31, 32 each utilizing a CMOS inverter and further comprised of the condensers 33, 34 formed by the NMOS transistors Qn32, Qn33.

In this circuit configuration, the voltage of the input terminal (node a) of the condenser 33 must always be higher than the voltage at the output terminal (node b) of the condenser 33 so that the channel of the NMOS transistor is always connected in the orientation shown in the figure. Since the voltage potential of node a' and node b' are also the same on the condenser 34 side, the NMOS transistor Qn33 connections are also the same as for the NMOS transistor Qn33. The condensers 33 and 34 can also be formed by (depression) MOS transistors.

In the above described first working example (FIG. 6) as well as the variations (FIG. 8, FIG. 10, FIG. 11), the positive phase clock and the reverse phase clock clamping of the other (complementary) clock was performed based on the reverse phase clock and the positive phase clock but positive phase clock and reverse phase clock clamping can also be performed based on its own clock. This clock clamping is explained below in the second working example.

Figure 12:
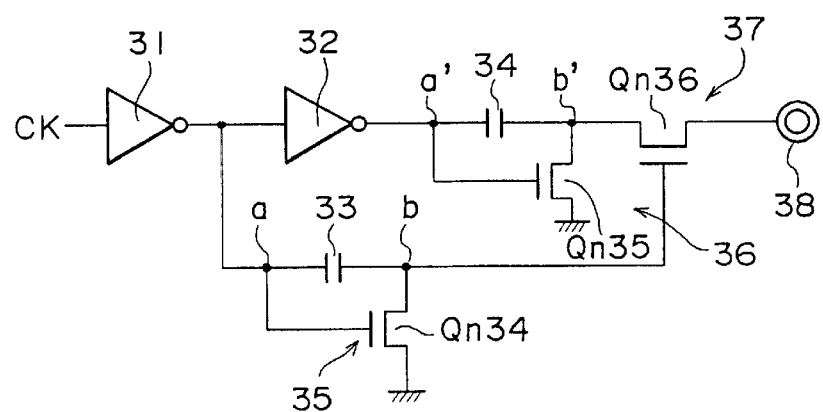
FIG. 12 is a circuit diagram showing the second working example of the clamp circuit and sampling switch.

FIG. 12 is a circuit diagram showing the second working example of the clamping circuits 35, 36 and sampling switch 37. In the figure, sections identical to FIG. 5 are shown with the same reference numerals.

A clamping-circuit 35 is comprised of an NMOS transistor Qn34 connected between the output end (node b) of the condenser 33 and ground, and having a gate connected to the input end (node a) of the condenser 33. A clamping circuit 36 is comprised of an NMOS transistor Qn35 connected between the output end (node b') of the condenser 34 and ground, and having a gate connected to the input end (node a') of the condenser 34. A sampling circuit 37 is comprised of an NMOS transistor Qn36 connected between node b' and the circuit output terminal 38, and having a gate connected to node b.

Thus, even if positive phase clock and reverse phase clock clamping is performed based on its own (autonomous) clock in this way, a reverse phase clock as a clamped output of the clamping circuit 35, can be obtained versus an input clock having an amplitude from –vdd to zero (0) volts, the same as when performing clamping in the first working example based on the other (complementary) clock, and a positive phase clock can be obtained as a clamped output of the clamping circuit 36, versus an input clock having an amplitude from –vdd to zero (0) volts.

Figure 13:
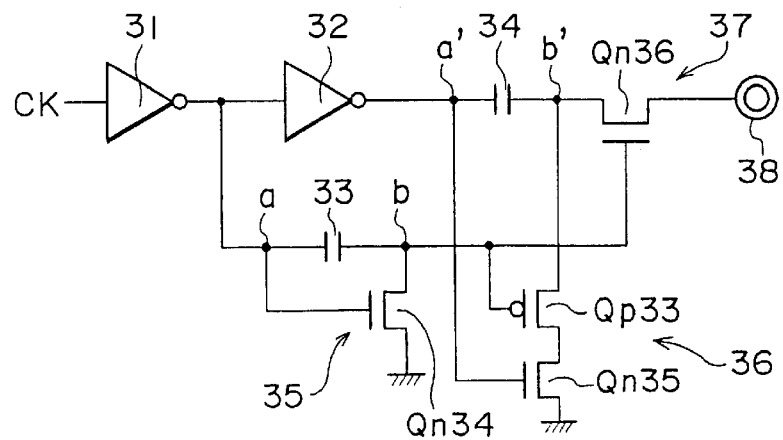
FIG. 13 is a circuit diagram showing the third working example of the clamp circuit and sampling switch.

FIG. 13 is a circuit diagram showing the third working example of the clamping circuits 35, 36 and sampling switch 37. In the figure, sections identical to FIG. 12 are shown with the same reference numerals.

The clamping circuit 35 is comprised of an NMOS transistor Qn34 connected between the output end (node b) of the condenser 33 and ground, and having a gate connected to the input end (node a) of the condenser 33. A clamping circuit 36 is comprised of an NMOS transistor Qn35 and a PMOS transistor Qp33 connected in serial between the output end (node b') of the condenser 34 and ground. The gate of the PMOS transistor Qp33 is connected to the node b, and the gate of the NMOS transistor Qn35 is connected to the node a'.

In the circuit configuration of the third working example, a pulse (clock pulse) with a polarity opposite that of node b, is applied to the gate of the NMOS transistor Qn35, to allow the "H" level of node b' to be clamped at a sufficiently low impedance.

In the above mentioned working examples 2 and 3, the same as in the first working example, variations can be applied such as connecting a Zener diode between the circuit output terminal 38 and ground, comprising the inverters 31, 32 of CMOS inverters, and comprising the condensers 33, 34 of MOS capacitors.

The description of the embodiment for the negative power generator 22 of this invention utilized a liquid crystal display integrated-with-drive circuit having a horizontal driver 19 and a vertical driver 20 integrated (on-chip) along with the effective pixel area 12, onto the LCD panel 21. However this invention is not limited to this arrangement and is applicable to a liquid crystal display integrated-with-drive circuit having the horizontal driver 19 mounted exterior to the chip and the vertical driver 20 mounted on the chip.

The example applied to this embodiment further described the negative voltage generated by the negative power generator 22 as supplied to the vertical driver 20, however this invention is not limited to this arrangement and is also applicable to other circuits requiring supply of a negative voltage from a liquid crystal display integrated-with-drive circuit having a negative power supply. An applicable example is described below.

Figure 14:
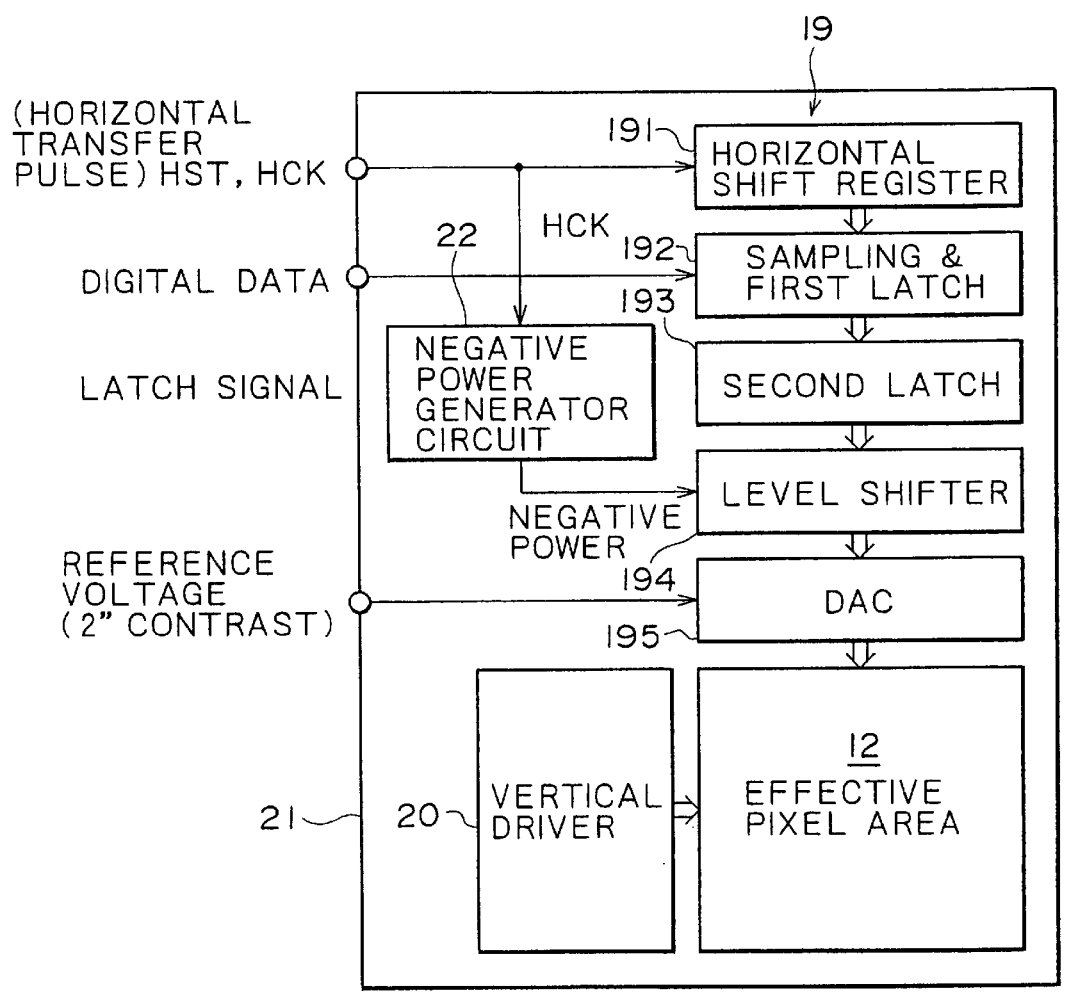
FIG. 14 is a block diagram showing the structure of the active matrix liquid crystal display device mounted with the negative power generator circuit of the first embodiment.

FIG. 14 is a block diagram showing the structure of the active matrix liquid crystal display device mounted with the negative power generator circuit of the first embodiment. In the figure, sections identical to FIG. 1 are shown with the same reference numerals. In the liquid crystal display integrated-with-drive circuit of this example, the horizontal driver 19 is comprised of a horizontal shift register 191, a sampling & first latch circuit 192, a second latch circuit 193, a level shifter 194 as well as a DA (digital/analog) converter 195.

In the horizontal driver 19, a horizontal start pulse HST and a horizontal clock pulse HCK are applied to the horizontal shift register 191 as horizontal transfer pulses. When these pulses are applied, the horizontal shift register 191 responds to the horizontal start pulse HST and performs horizontal scanning by outputting shift pulses from each stage at the period of the horizontal clock HCK. The sampling & first latch circuit 192 responds to the shift pulses output from the horizontal shift register 191, and sequentially samples the digital data, and further latches the sampled data in each source line (column line) of the effective pixel area 12.

The latched data corresponding to each source line latched by the sampling & first latch circuit 192, is re-latched by the second latch circuit 193 every 1H (H is the horizontal scanning period) in response to a latch signal supplied in the 1H period. The level shifter 194 level shifts (level conversion) the latch data that was re-latched by the second latch circuit 193, to a specified signal level, and supplies this level-shifted signal to the DA converter 195.

The DA converter 195, converts the digital data that was level-shifted in the level shifter 194, to an analog signal for each source line of the effective pixel area 12, and supplies this analog signal to the corresponding source line. A reference voltage selector type DA converter is utilized as the DA converter 195 to receive the data that was level-shifted by the level shifter 194, select the target reference voltage from among several contrast (gradient) reference voltages, and output the selected reference voltage to the corresponding source line.

The liquid crystal display device configured as above, By utilizes a common voltage VCOM (See FIG. 1) inverted every 1H, as a VCOM inverted drive voltage. In the liquid crystal device utilizing the VCOM inverted drive, when MOS transistors are utilized as the analog switch for selecting the reference voltage, in the DA converter 195 for selecting a reference voltage for example, in a range of 0 volts to 5 volts, and when the threshold voltage Vthp of the PMOS transistor and the threshold voltage Vthn of the NMOS transistor are set to obtain a dynamic range for the selected reference voltage, then the "L" level of the selected data signal must be 0-Vthp or less, and the "H" level must be 5 volts +Vthn or more.

The amplitude of the select data signal must therefore be set lower in the reference voltage range by an amount equal to the PMOS transistor threshold voltage Vthp, and must be set higher in the range (0 volts-Vthp, through 5 volts +Vthn, in the above example) by an amount equal to the NMOS transistor voltage Vthn, so that a level shifter 194 is installed in the prestage of the DA converter 195. This level shifter 194 must utilize a negative power supply for the reasons given next.

As shown in FIG. 14, in the above example, a negative power generator 22 is incorporated into the LCD panel 21 so that the negative voltage generated by the negative power generator 22 is supplied to the level shifter 194. In this way, by incorporating a negative power generator 22, there is no need to install a negative power generator 22 outside of the LCD panel 21 and the burden of set design can therefore be reduced by a corresponding amount.

The above example, described a case applicable to a liquid crystal display integrated-with-drive circuit, however this invention is not limited to application to a liquid crystal display integrated-with-drive circuit and can also be applied to all devices requiring a negative power supply voltage.

Figure 15:
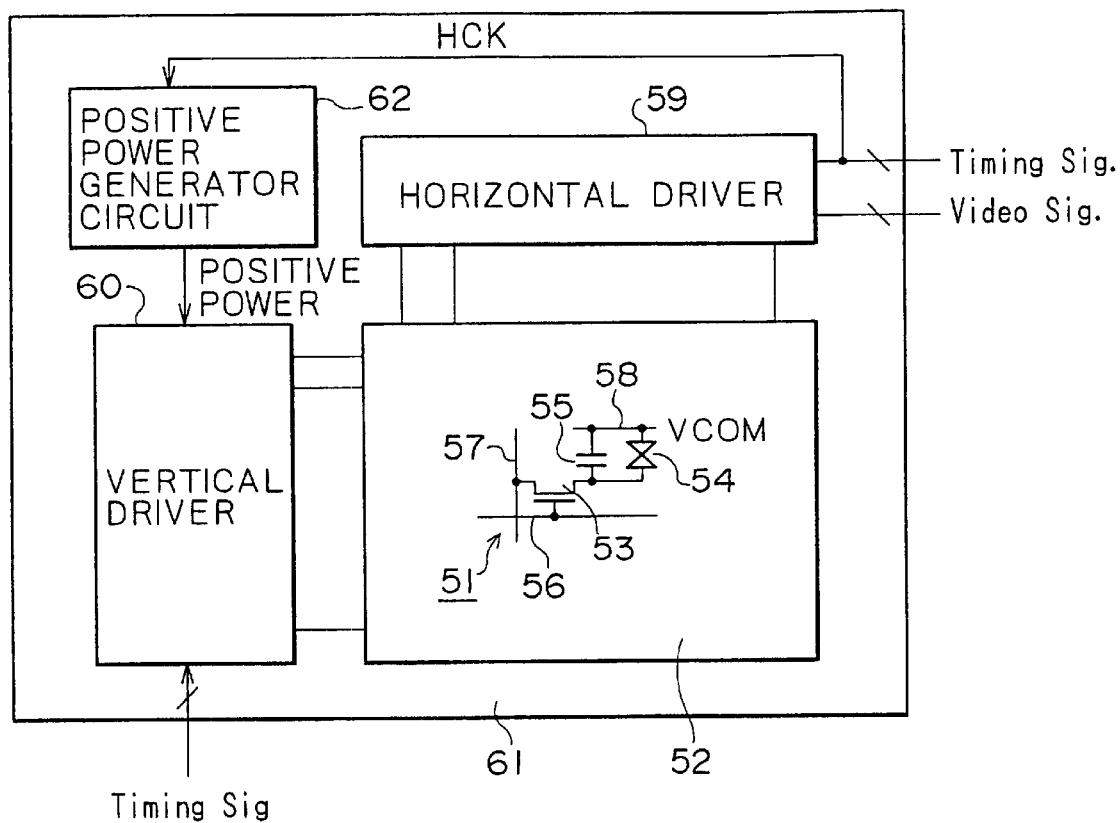
FIG. 15 is a block diagram showing the structure of the active matrix liquid crystal display device of the second embodiment of this invention.

FIG. 15 is a block diagram showing the structure of the active matrix liquid crystal display device of the second embodiment of this invention.

The pixel 51 in FIG. 15 comprises an effective pixel area 52 arrayed in a two-dimensional matrix. In this effective pixel area 52, the pixel 51 is comprised of a thin film transistor 53, a liquid crystal cell 54 with a pixel electrode connected to the drain electrode of the thin film transistor 53. and an auxiliary capacitor 55 with one electrode connected to the drain electrode of the thin film transistor 53.

In the pixel structure, the thin film transistor 53 of each pixel 51 has a gate electrode connected to the gate line (scan line) 56, and also has a source electrode connected to the source line (signal line) 57. The opposing electrode of the liquid cell 54 and the other electrode of the auxiliary capacitor 55 are connected to the common line 58 from which the common voltage VCOM is supplied.

A horizontal driver 59 is installed for instance on the upper side of the effective pixel area 52, and a vertical driver (scan driver) 60 is installed for instance on the left side. The horizontal driver 59 operates based on a timing signal such as the horizontal clock HCK, and performs dot sequential writing of the actual data onto each pixel 51 based on the input video signal (Video Sig.). The vertical driver 60 operates based on a timing signal such as the vertical clock VCK, and sequentially drives each pixel 51 in line units.

The horizontal driver 59 and the vertical driver 60 are integrated onto the LCD panel 61 and the effective pixel area 52 utilizing polysilicon thin film transistors. In this way, a liquid crystal display integrated-with-drive circuit is comprised, formed on the LCD panel 61 along with the effective pixel area 52 and the drive circuit containing the horizontal driver 59 and the vertical driver 60. Also in this embodiment, a positive voltage power generator circuit 62 is integrated onto the LCD panel 61 utilizing the polysilicon thin film transistors.

An internal positive voltage power generator circuit 62 supplies the generated positive voltage to a drive circuit such as the vertical driver 60. A clock is input to the vertical driver 60 that is faster (has a higher frequency) than the vertical clock VCK, such as the horizontal clock HCK input to the horizontal driver 59, and a positive voltage generated based on this horizontal clock HCK, this positive voltage is then supplied to the second positive power supply line for the output stage of the vertical driver 60. The input clock for the positive voltage supply generator circuit 62 is not limited to the timing clock input to the horizontal driver 59, and a clock utilized in supply of another positive voltage may be utilized.

Figure 16:
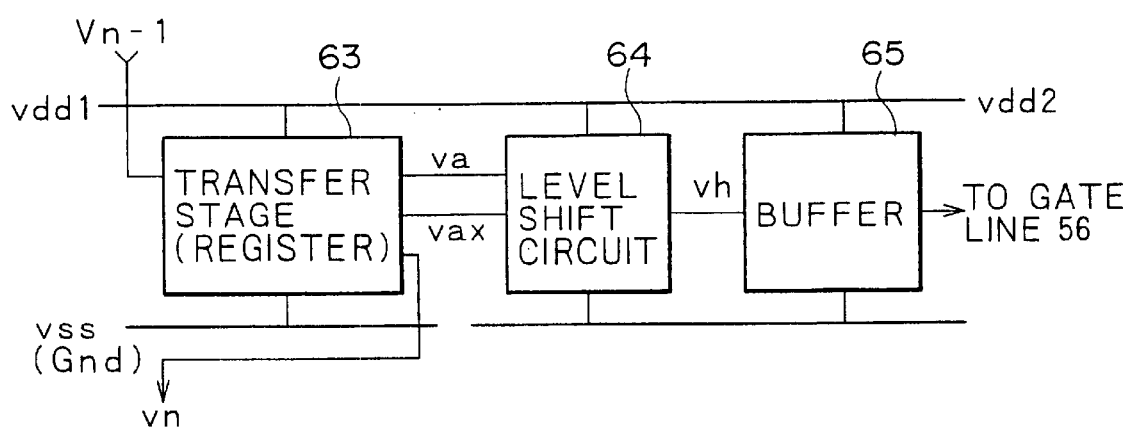
FIG. 16 is a block diagram showing the structure of the shift register comprising the vertical driver of the second embodiment.

FIG. 16 is a block diagram showing the structure of the shift register comprising the vertical driver 60 for the active matrix display device of the second embodiment. This figure shows the structure of the shift register transfer (register) stages and their output stages.

In FIG. 16, the nth transfer stage (register) 63 utilizes a first positive voltage supply vdd1 and a negative power supply vss (ground in this example) as the drive voltage and besides shifting the shift pulse Vn−1 obtained from the previous stage (n−1) and supplying the shift pulse Vn thus obtained to the next stage (n+1), also outputs the mutually complementary scan pulses va, vax in synchronization with this shift pulse. The amplitude of these scan pulses va, vax as clearly shown in the waveform (a) in FIG. 17 is from vss to vdd1.

The scan pulses va, vax are supplied to the level shift circuit 64. The level shift circuit 64 utilizes the negative power supply vss and the previously mentioned second positive power supply vdd2 (vdd1<vdd2) generated by the positive voltage power generator circuit 62 as a drive voltage and as shown in waveform (b) of FIG. 17, performs a level shift (level conversion) of the scan pulses va, vax at an amplitude from vss to vdd1, to the scan pulse vb with an amplitude from vss to vdd2. This scan pulse vb drives the nth line of the gate line (scan line) 56 of the effective pixel area 52 (See FIG. 15) by way of the buffer 65 operating on the second positive power supply vdd2 and the negative power supply vss.

The circuit configuration shown in FIG. 4, in other words, a circuit structure having a CMOS latch cell and CMOS inverter is used as the level shift circuit 64. However, the second negative power supply vss2 in FIG. 4 has been changed to the negative power supply vss and the positive power supply vdd has been changed to the second positive power supply vdd2.

As related above, in the liquid crystal display integrated-with-drive circuit, by incorporating the positive voltage power generator circuit 62 into the LCD panel 61, and supplying the positive voltage generated by the positive voltage power generator circuit 62 to the vertical driver 60, there is no need to install a positive power generator circuit outside of the LCD panel 61 so that the task of set design can be considerably alleviated.

The amplitude of the scan pulses (gate select pulse) applied to the gate line 56 can be increased even without raising the power supply voltage of the LCD panel 61 so that even if transistors with poor device characteristics such as the thin film transistor 53 are utilized, a sufficiently large voltage can be applied between the source and gate of the applicable transistor so that the thin film transistor 53 can be reliably turned on.

Thus, in a liquid crystal display device using the dot sequential scanning method, a scan pulse with a large amplitude can be applied to the gate line 56 even if the write times on the left side and right side of the LCD panel 61 are different. Further, since even the thin film transistor 53 for pixels having a short write time on the right side of the panel can be turned on reliably, the writing onto the pixels can be sufficiently performed. A difference between the left side and right side of the LCD panel 61 in luminance that accompanies the difference in write times can therefore be avoided.

FIG. 18 is a block diagram showing the structure of the positive power generator circuit 62. The positive power generator circuit 62 has the inverters 71, 72 to invert the input clock and again perform inversion, the condensers (filters) 73, 74 to remove the direct current component of each inverted output from the inverters 71, 72 the clamping circuits 75, 76 to clamp the outputs of the condensers 71, 72 to a positive reference voltage level (in this example, power supply voltage level vdd), and a sampling switch 77 to sample the clamped output of the clamping circuit 76 based on the clamped output of the clamping circuit 75, and in this structure, the positive power supply voltage 2vdd from the circuit output terminal 78 is output as the second positive power supply voltage vdd2.

The circuit operation of the positive power generator circuit 62 will be described next.

In this positive power generator circuit 62, a clock having an amplitude from 0 volts to vdd, such as the horizontal clock HCK, is input to the horizontal driver 59 (See FIG. 15). This input clock is inverted by the inverter 71 and then further inverted by the inverter 72. The inverted clocks of the inverters 71,72 or in other words, the reverse phase clock and the positive phase clock with respect to the input clock, are passed through the condensers (filters) 73,74 and their direct current components removed.

Each clock passing through the condenser 73, 74 is then clamped by the power supply voltage vdd, at its respective "L" level by the clamping circuits 75, 76. The clamped outputs of the clamping circuits 75, 76 therefore have an amplitude between vdd to 2vdd and mutually opposite phases as clearly shown in the waveform. The sampling switch 77 turns on at the "L" level clamp output of the clamping circuit 75 or in other words, is turned on by vdd, so that the "H" level of the clamped output of the clamping circuit 76, or in other words 2vdd, is output. This "H" level clamped output from the clamping circuit 76 is output from the circuit output terminal 78 as the positive supply voltage 2vdd.

FIG. 19 is a circuit diagram showing a first working example of the clamping circuits 75, 76 and sampling switch 77. Sections in the figure, identical to FIG. 18 have the same reference numerals.

The clamping circuit 75 is comprised of an NMOS transistor Qn71 connected between the output electrode of the condenser 73 and the power supply vdd, and having a gate connected to the output electrode of the condenser 74. The clamping circuit 76 is comprised of an NMOS transistor Qn72 connected between the output end of the condenser 74 and the power supply vdd, and having a gate connected to the output end of the condenser 73. The sampling switch 77 is comprised of a PMOS transistor Q71 connected between the output end of the condenser 74 and the circuit output terminal 78 and having a gate connected to the output end of the condenser 73.

The circuit operation of the clamping circuits 75, 76 as well as the sampling switch 77 is described next.

When the positive phase of the clock is at "H" level with respect to the input clock, the direct current components of that positive phase clock are eliminated in the condenser 74, and the voltage potential at the output end (hereafter called node B) of the condenser 74 swings somewhat to the plus side. The NMOS transistor Qn71 then turns on, and the voltage potential of the output end (hereafter called node A) of the condenser 73 the NMOS transistor Qn71 starts to be pulled to the power supply vdd side.

When the voltage potential at node A is pulled to the power supply vdd side, the NMOS transistor Qn72 also turns on. The voltage potential of node B of the NMOS transistor Qn72 then starts to pull to the plus side at this point and the voltage potential of node B increases further. When the voltage potential of node B increases, the voltage potential of node A approaches even further to the vdd power supply side. The above operation repeats in a so-called positive feedback process so that the "L" level (0 volts) of node A is clamped at the power supply voltage level vdd. The clamped output of the clamping circuit 75 thus becomes a clock with a reverse phase versus the input clock having an amplitude from vdd to 2vdd.

When the reverse phase of the clock is at "L" level with respect to the input clock, the direct current components of this reverse phase clock are cut (eliminated) by the condenser 73 so that the voltage potential of node A swings somewhat to the plus side, and as a result, the NMOS transistor Qn72 turns on. When the NMOS transistor Qn72 turns on, the voltage potential of node B of the NMOS transistor Qn72 starts to pull to the power supply vdd side.

When the voltage potential of node B is pulled to the power supply vdd side, the NMOS transistor Qn71 also turns on. The node A voltage potential of the NMOS transistor Qn71 then starts to pull to the plus side and the voltage potential of node A rises even further. When the voltage potential of node A rises, the voltage potential of node B approaches the power supply vdd side even further. The "L" level of the node B is clamped at the power supply voltage level vdd by this positive feedback. The clamped output of the clamping circuit 76 thus has a positive phase clock versus the input clock having an amplitude of vdd to 2vdd.

When the voltage potential of node A is a "L" level, or in other words at vdd, the PMOS transistor Qp71 turns on so that the clamped output of the reverse phase of node B and the clamped output of node A, in other words "H" level (2vdd) is output. Also, when the voltage potential of node A is a "H" level, or in other words at 2vdd, the PMOS transistor Qn71 turns off so that the 2vdd is output as is.

In this way, positive feedback is applied by performing a clamping operation with the clamping circuits 75,76 based each other's input clock so that the reference voltage level is securely clamped (in this example, at the positive power supply voltage level vdd), and a power supply voltage 2vdd can be generated which is twice the level of the applicable reference voltage level.

Figure 20:
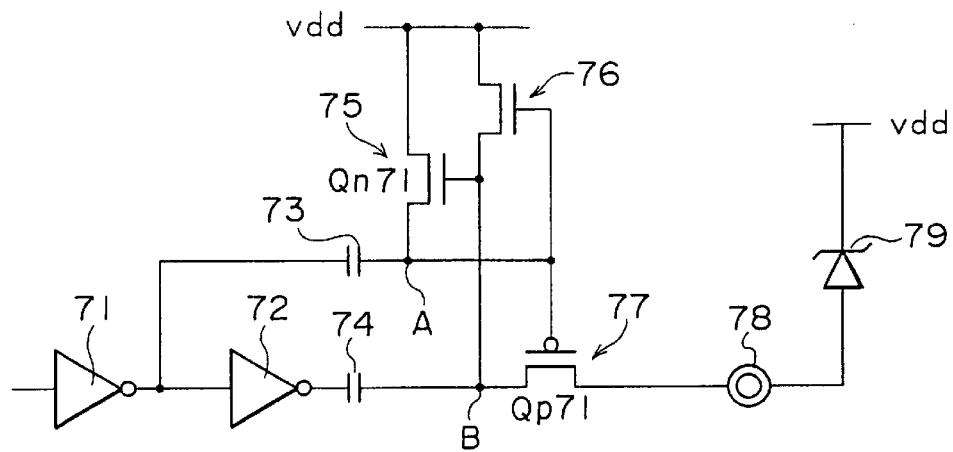
FIG. 20 is a circuit diagram showing a variation of the positive power generator circuit.
Figure 21:
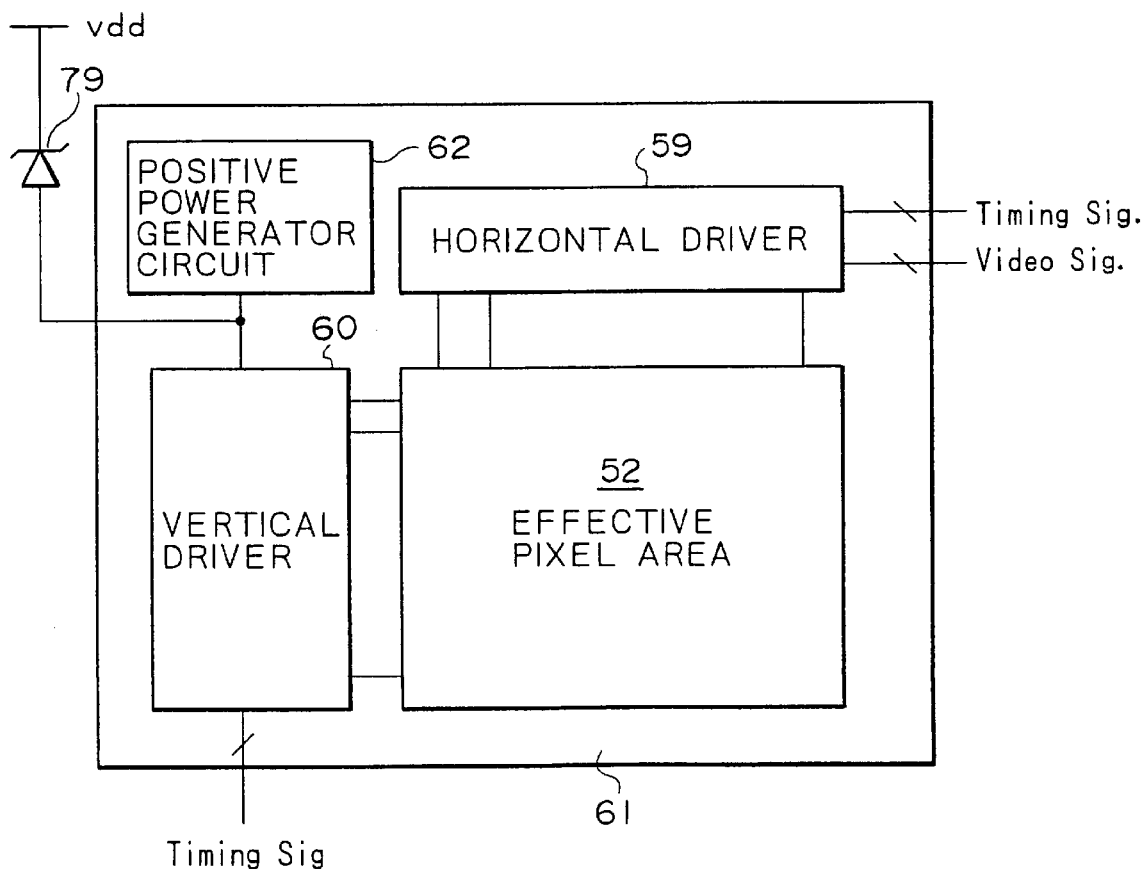
FIG. 21 is block diagram showing the structure of the active matrix liquid crystal display device mounted with a variation of the positive power generator circuit.

FIG. 20 is a circuit diagram showing a first variation of the positive power generator circuit 26. Sections in the figure identical to FIG. 19 are shown with the same reference numerals. In the first variation, a fixed voltage means, is comprised for instance of a Zener diode 79 connected between the circuit output terminal 78 and the power supply vdd.

When the positive power generator circuit 62 of this first variation is mounted in the liquid crystal display integrated-with-drive circuit, then the Zener diode 79 is mounted outside of the LCD panel 51.

Thus, by connecting the Zener diode 79 between the circuit output terminal 78 and the power supply vdd, the voltage of the positive power supply voltage 2vdd will be determined by the Zener diode 79 voltage so that the desired voltage of the positive power supply voltage 2vdd can be stably acquired and easily set with this fixed voltage means by selecting an applicable Zener diode voltage. Further, this fixed voltage means is not limited to a Zener diode, and a bipolar diode or MOS diode may also be utilized.

Another variation of the positive power generator circuit 62 is shown by a variation having the same structure as the negative power supply circuit 22 shown in FIG. 10 and FIG. 11. The clamping circuits 75, 76 and the sampling switch 77 may have the same circuit structure as shown in FIG. 12 and FIG. 13. In this case, each MOS transistor comprising the clamping circuits 75, 76 and the sampling switches 77, utilize transistors having reversed conduction versus the clamping circuits 35, 36 and the sampling switch 37, and further the ground has been substituted with the power supply vdd.

The above embodiment was explained by utilizing an example in which the liquid crystal display integrated-with-drive circuit was mounted (on-chip) with the positive power generator circuit 62 along with the horizontal driver 59 and vertical driver 60 onto the LCD panel 71 with effective pixel area 52, however this invention is not limited to this arrangement, and is also applicable to a liquid crystal display integrated-with-drive circuit having the vertical driver 59 off-chip, and the vertical driver 60 on-chip.

An example was further utilized whereby the positive voltage generated in the positive power generator circuit 62 was supplied to the vertical driver 60 however this invention is not limited to this example and is also applicable to other circuits requiring the supply of a positive voltage from the power supply of the liquid crystal display integrated-with-drive circuit.

Figure 22:
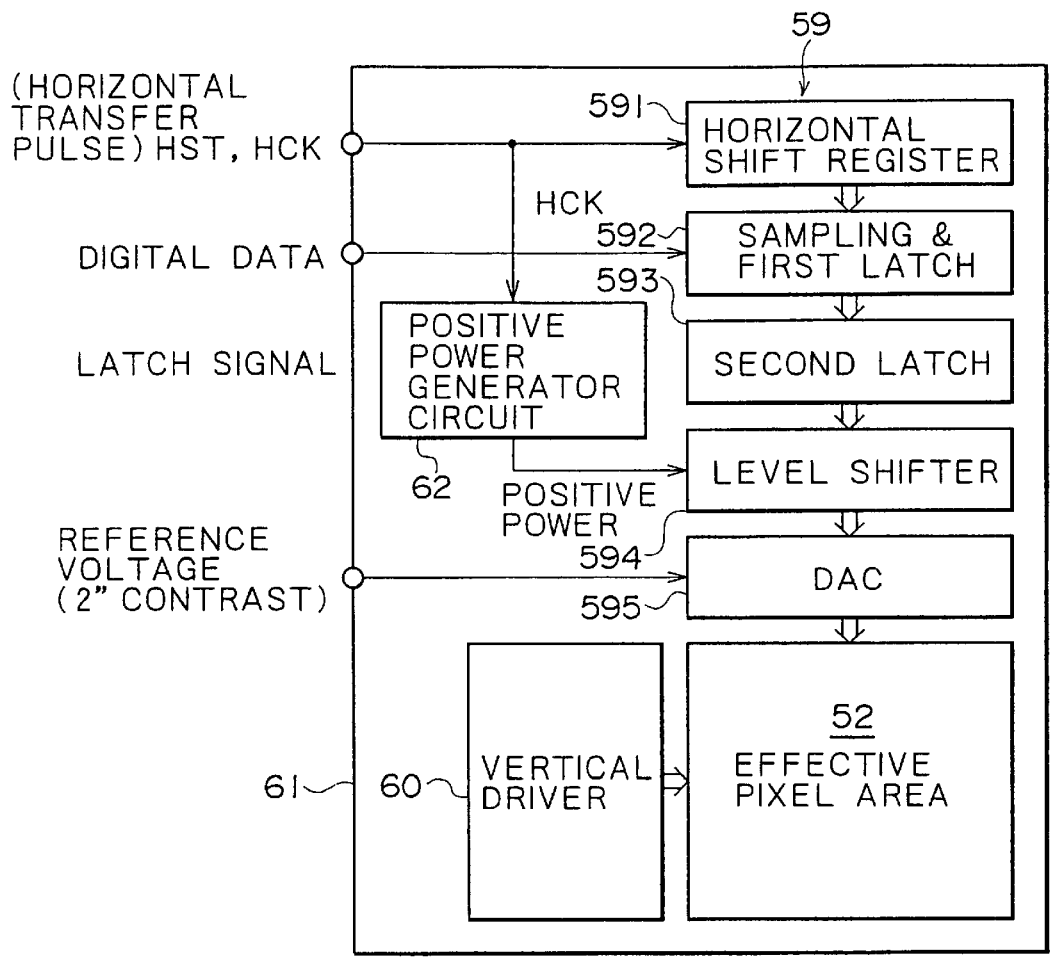
FIG. 22 is block diagram showing the structure of the active matrix liquid crystal display device mounted with the positive power generator circuit of the second embodiment.
Figures 23A, 23B:
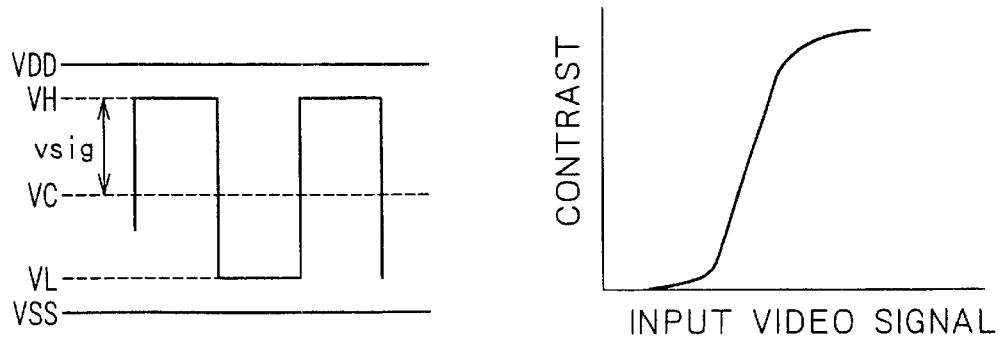
FIG. 23A is a chart showing the relation of the drive voltage of the liquid crystal display device and the amplitude of the video signal.
FIG. 23B is a graph showing relation of the input video signal and the contrast.
Figure 24:
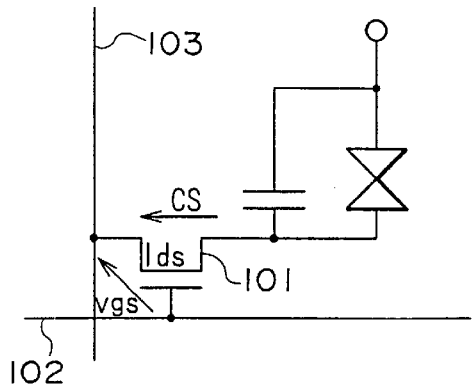
FIG. 24 is a circuit diagram of the equalizer circuit for the pixels.
Figure 25:
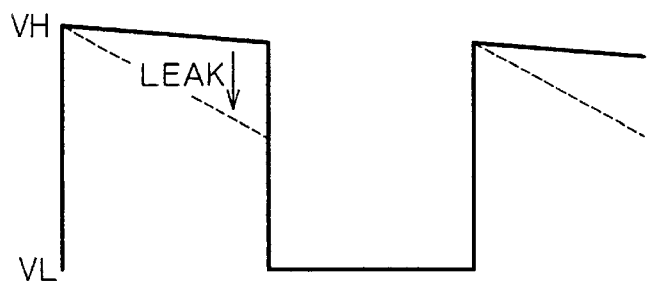
FIG. 25 is a waveform drawing illustrating the principle how a leak luminance spot occurs.
Figure 26:
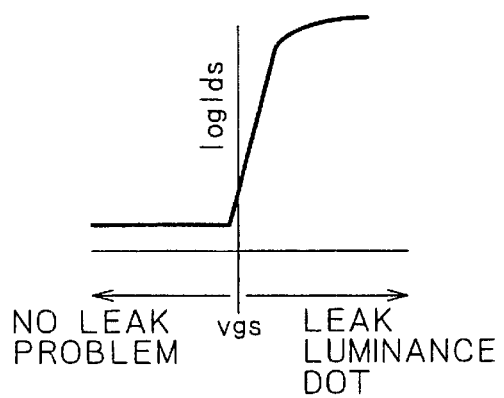
FIG. 26 is a diagram showing the characteristics of the pixel transistor.

FIG. 22 is block diagram showing another example of the structure of the active matrix liquid crystal display device. Sections in the figure identical to FIG. 15 have the same reference numerals.

In the liquid crystal display integrated-with-drive circuit of this example, the vertical driver 59 is comprised of a horizontal shift register 591, a sampling & first latch circuit 592, a second latch circuit 593, a level shifter 594 and a DA converter 595. In the horizontal driver 59, the circuits 591 through 595 have the same functions as the circuits 191 through 195 of FIG. 14. A detailed description is omitted since these circuits are redundant.

In the structure of the liquid crystal display device, a VCOM inverted drive is utilized to invert the common voltage VCOM (see FIG. 15) each 1H period. In the liquid crystal display device utilizing this VCOM inverted drive, when MOS transistors are utilized as the analog switches for selecting a reference voltage for instance, in a range of 0 volts to 5 volts in the DA converter 595 and a PMOS transistor threshold voltage of Vthp and NMOS transistor threshold voltage of Vthn are set in order to maintain a dynamic range for that selected reference voltage, the "L" level of the selected data signal must be 0 volts−Vthp or less, and the "H" level must be 5 volts +Vthn or more.

The amplitude of the select data signal must therefore be set lower in the reference voltage range by an amount equal to the PMOS transistor threshold voltage Vthp, and must be set higher in the range (0 volts−Vthp, through 5 volts +Vthn) by an amount equal to the NMOS transistor voltage Vthn, so that a level shifter 595 is installed in the prestage of the DA converter 595. This level shifter 594 must utilize a positive power supply for the reasons given next.

In this above example as shown in FIG. 22, a positive power generator 62 is incorporated into the LCD panel 61 so that the positive voltage generated by the positive power generator circuit 62 is supplied to the level shifter 594. In this way, by incorporating a positive power generator 62, there is no need to install a positive power generator 62 outside of the LCD panel 61 and the burden of set design can therefore be reduced by a corresponding amount.

The above example, described a case applicable to a liquid crystal display integrated-with-drive circuit, however this invention is not limited to application to a liquid crystal display integrated-with-drive circuit and can also be applied to all devices requiring a positive power supply voltage.

The explanation of the first embodiment utilized an example incorporating a negative power generator circuit 22, and the explanation of the second embodiment utilized an example incorporating a positive power generator 62 however, a structure incorporating both a negative power generator circuit 22 and a positive power generator 62 may also be used.

In the liquid crystal display integrated-with-drive circuit according to the invention as described above, by incorporating a power generator circuit into the LCD panel, and supplying the voltage generated by the voltage power generator circuit to the drive circuit, there is no need to install a power generator circuit outside of the LCD panel so that the task of set design can be considerably alleviated. Also, in the liquid crystal display device incorporating a negative power generator circuit for generating a negative voltage, the dynamic range of the input signal can be expanded without raising the panel power supply voltage, and good image quality (especially contrast) can be obtained.

Also, in the liquid crystal display device incorporating a positive power generator circuit for generating a positive power supply voltage, since the amplitude of the gate select pulses can be increased even without raising the power supply voltage of the LCD panel, the writing onto a pixel can be sufficiently performed even in a short time, so that no difference in luminance will occur when using the dot sequential scanning method, even if the write times on the left side and the write side of the LCD panel are different, and a good image quality can be obtained.

What is claimed is:

1. A power generator circuit comprising:
    first clamping circuit, a second clamping circuit, and a sampling switch,
    said first clamping circuit clamping a first signal to a clamped voltage level, said first signal oscillating between a reference voltage level and said clamped voltage level;
    said second clamping circuit clamping a second signal to said clamped voltage level, said second signal oscillating between said reference voltage level and said clamped voltage level, said first signal being inverted to produce said second signal;
    said sampling switch including a supply voltage line, said supply voltage line providing a supply voltage, said first signal controlling said sampling switch to connect said second signal to said supply voltage line, said second signal being connected to said supply voltage line when said second signal is at said reference voltage level.

2. A power generator circuit as claimed in claim 1 wherein
    said second signal controls said first clamping circuit to clamp said first signal to said clamped voltage level, and
    said first signal controlling said second clamping circuit to clamp said second signal to said clamped voltage level.

3. A power generator circuit as claimed in claim 1 wherein
    a first clock signal controls said first clamping circuit to clamp said first signal to said clamped voltage level, a first direct current component being removed from said first clock signal to produce said first signal, and
    a second clock signal control said second clamping circuit to clamp said second signal to said clamped voltage level, a second direct current component being removed from said second clock signal to produce said second signal.

4. A power generator circuit as claimed in claim 1 wherein said clamped voltage level is at ground level.

5. A power generator circuit as claimed in claim 1 wherein said clamped voltage level is a positive voltage level.

6. A power generator circuit as claimed in claim 1 wherein said reference voltage level is a negative voltage level, said negative voltage level being less than ground level.

7. A power generator circuit as claimed in claim 1 wherein said reference voltage level is a positive voltage level, said positive voltage level being greater than ground level.

8. A power generator circuit as claimed in claim 1 further comprising:
    a zener diode connected to said supply voltage line, said zener diode establishing a supply voltage level.

9. A power generator circuit as claimed in claim 1 wherein said first signal is a clock signal.

10. A power generator circuit as claimed in claim 1 wherein said second signal is a clock signal.

11. A power generator circuit as claimed in claim 1 further comprising:
    a clock signal inverter, said clock signal inverter inverting a clock signal to produce said first signal.

12. A power generator circuit as claimed in claim 1 further comprising:
    an first signal inverter, said first signal inverter inverting said first signal to produce said second signal.

13. A power generator circuit as claimed in claim 1 further comprising:
    a first signal condenser, said first signal condenser removing a direct current component from said first signal.

14. A power generator circuit as claimed in claim 1 wherein said first condenser is connected to said first clamping circuit.

15. A power generator circuit as claimed in claim 1 further comprising:
    a second signal condenser, said second signal condenser removing a direct current component from said second signal.

16. A power generator circuit as claimed in claim 15 wherein said second condenser is connected to said second clamping circuit.

17. A power generator circuit as claimed in claim 1 further comprising:
    a second signal condenser, said second signal condenser removing a direct current component from said second signal.

* * * * *